United States Patent [19]

Catlow

[11] Patent Number: 4,826,403
[45] Date of Patent: May 2, 1989

[54] TURBINE

[75] Inventor: Ronald Catlow, Derby, England

[73] Assignee: Rolls-Royce plc, London, England

[21] Appl. No.: 49,409

[22] Filed: May 14, 1987

[30] Foreign Application Priority Data

Jul. 2, 1986 [GB] United Kingdom ............... 8616153

[51] Int. Cl.[4] ............................................. F01D 5/30
[52] U.S. Cl. .................................... 416/129; 416/171;
416/193 R; 416/190; 416/198 A; 415/134;
415/77; 415/91
[58] Field of Search ................ 415/134–136,
415/77, 91, 62, 65, 68; 416/129, 192, 193 R,
171, 190, 198 A; 60/39.162, 268

[56] References Cited

U.S. PATENT DOCUMENTS

| | | | |
|---|---|---|---|
| 2,411,124 | 11/1946 | Baumann | 416/171 X |
| 2,451,944 | 10/1948 | Hall | 416/198 A X |
| 2,478,206 | 8/1949 | Redding | 416/171 X |
| 2,505,660 | 4/1950 | Baumann | 416/171 X |
| 2,971,745 | 2/1961 | Warren et al. | 416/193 |
| 3,363,419 | 1/1968 | Wilde | 416/171 X |
| 3,494,539 | 2/1970 | Littleford | 416/171 |
| 3,748,058 | 7/1973 | Bouiller et al. | 415/123 |
| 3,754,839 | 8/1973 | Bodman | 416/190 X |
| 3,768,933 | 10/1973 | Bouiller et al. | 415/77 X |
| 3,811,791 | 5/1974 | Cotton | 416/171 X |
| 4,621,978 | 11/1986 | Stuart | 416/171 X |
| 4,767,271 | 8/1988 | Catlow | 416/129 |

FOREIGN PATENT DOCUMENTS

| | | | |
|---|---|---|---|
| 1134558 | 4/1957 | France | 415/77 |
| 570149 | 12/1957 | Italy | 416/190 |
| 1251955 | 11/1971 | United Kingdom | 415/129 |
| 1299929 | 12/1972 | United Kingdom | 416/190 |
| 1454374 | 11/1976 | United Kingdom | 416/192 |
| 2129502 | 5/1984 | United Kingdom | 60/268 |

*Primary Examiner*—Everette A. Powell, Jr.
*Attorney, Agent, or Firm*—Cushman, Darby & Cushman

[57] ABSTRACT

A power turbine (12) comprises alternate annular arrays of contra-rotatable turbine blades. Two arrays of turbine blades (30) and (47) have annular arrays of aerofoil propulsion blades (17,18) respectively attached thereto. Alternate arrays of turbine blades are attached to a primary drum member (55) in such a manner that below normal operating temperatures, limited relative radial movement is permitted between them. However when the normal operating temperature is reached, the relative radial movement is inhibited in such a manner that the rigidity of the power turbine (12) enhanced.

14 Claims, 4 Drawing Sheets

TURBINE

This invention relates to a turbine and is particularly concerned with a gas turbine engine power turbine.

One form of gas turbine engine suitable for aircraft propulsion comprises a core gas turbine engine of conventional construction which has a power turbine located at its downstream end. The power turbine comprises axially alternate annular arrays of contra-rotatable turbine blades which are drivingly connected to contra-rotatable aerofoil propulsion blades which may or may not be enclosed within a duct defined by a suitable cowling. Essentially the exhaust efflux from the core gas turbine engine is directed into the power turbine so as to cause contra-rotation of the turbine blades and in turn the aerofoil propulsion blades to provide propulsive thrust.

In one convenient form of construction for such a power turbine the aerofoil propulsion blades are positioned radially outwardly of the contra-rotatable turbine blades, and axially alternate annular arrays of turbine blades are attached at their radially outer ends to a drum assembly which serves the dual role of defining a portion of the radially outer boundary of the gas passage through the power turbine and a portion of the radially inner boundary to the airflow over the aerofoil propulsion blades.

It is desirable that the power turbine should be as light as possible and sufficiently rigid during normal operation as to ensure efficient operation. These two desirable objectives are, to a certain extent, frustrated by the fact that thermal gradients within the power turbine have to be accommodated and thus conventionally dictate the use of robust and therefore heavy turbine structure.

It is an object of the present invention to provide a lightweight turbine which, at its normal operational temperatures, has the necessary degree of rigidity.

According to the present invention a turbine comprises at least one annular array of rotary turbine blades and primary drum means surrounding the radially outer extents of the turbine blades and adapted to rotate coaxially therewith, said turbine blade radially outer extents and said primary drum means being interconnected by means which prevent relative axial movement between said turbine blades and said primary drum means, but which permit relative radial movement therebetween when said turbine is below its normal operational temperature, said interconnection means including abutment surfaces which are radially spaced apart when said turbine is below its normal operational temperature, said interconnection means being so arranged that when said turbine reaches its normal operational temperature, thermal expansion of said turbine blades causes said abutment surfaces to engage each other to inhibit relative radial movement between said turbine blades and said primary drum and thereby increase the rigidity of said turbine.

The invention will now be described by way of example with reference to the accompanying drawings in which.

Figure 1:
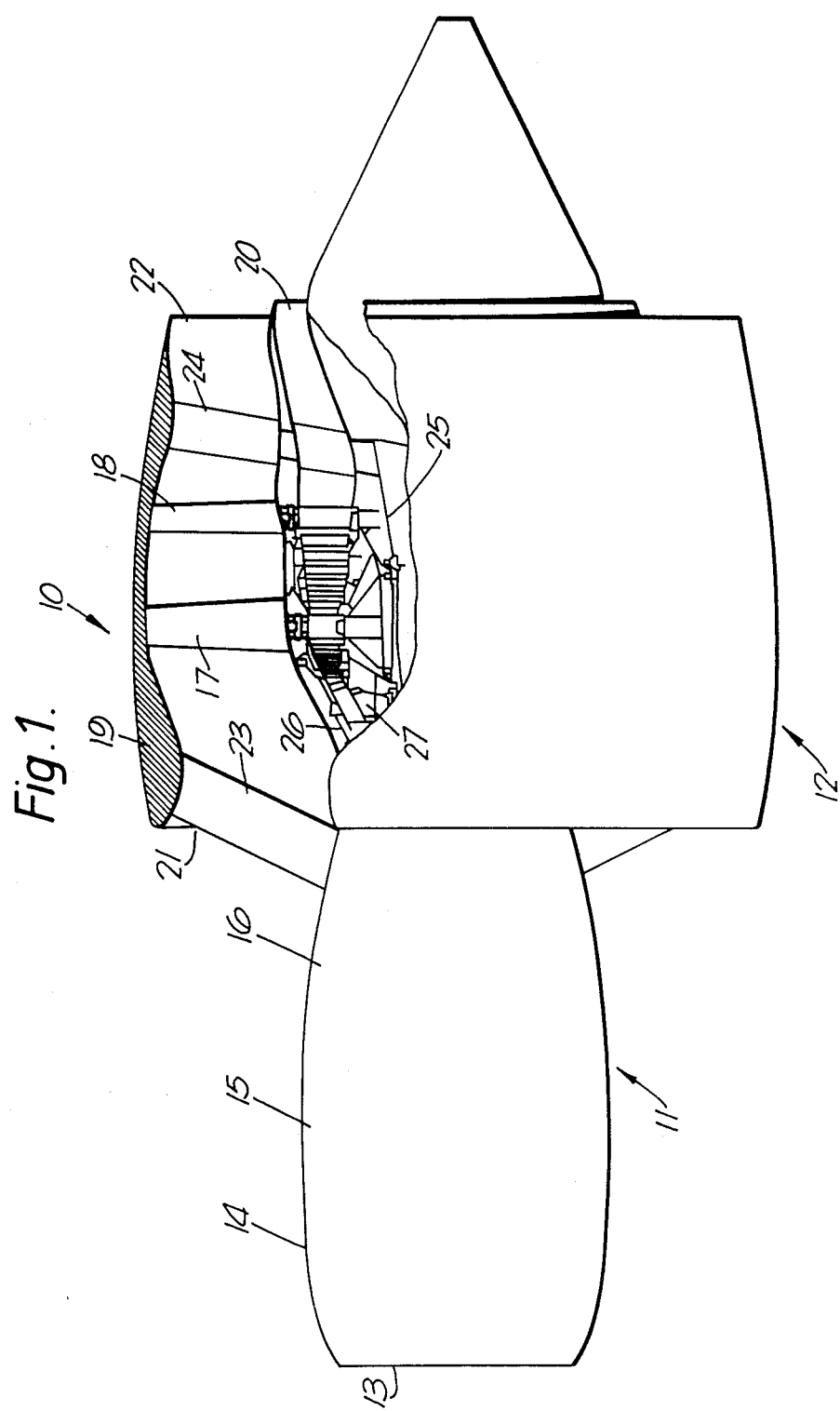
FIG. 1 is a partially broken away side view of a gas turbine engine having a power turbine in accordance with the present invention.

With reference to FIG. 1 a ducted fan gas turbine engine generally indicated at 10 comprises core engine 11 having a power turbine 12 located at its downstream end. The core engine 11 is of conventional construction in that it comprises an air intake 13, a compressor section 14, combustion equipment 15 and a turbine 16. The core engine 11 functions in the conventional manner in that air taken in through the intake 13 is compressed by the compressor section 14 before being mixed with fuel, and the mixture combusted in the combustion equipment 15 whereupon the resultant combustion products expand through the turbine 16. The combustion products are then exhausted from the core engine 11 into the power turbine 12.

The power turbine 12 is not of conventional construction in that it comprises a number of stages of contra-rotating blades, two stages of which have upstream and downstream fan aerofoil blades 17 and 18 respectively attached to their radially outer extent. The fan blades 17 and 18 contra-rotate and are enclosed by a fan cowling 19.

In operation hot gases exhausted from the core engine 11 are directed into the power turbine 12 to provide contra-rotation thereof and in turn contra-rotation of the fan blades 17 and 18. A certain amount of propulsive thrust is provided by the gases exhausted from the power turbine 12 through the annular outlet duct 20. However the majority of the propulsive thrust of the gas turbine engine 10 is provided by air which has been drawn in at the upstream end 21 of the fan duct and accelerated by the contra-rotating fan blades 17 and 18 before being exhausted from the downstream end 22 of the fan cowling 19.

The fan cowling 19 and the core engine 11 are interconnected by a plurality of generally radially extending forward struts 23, while a plurality of generally radially extending rearward struts 24 interconnect the fan cowling 19 with the remainder of the power turbine 12. The rearward struts 24 facilitate the majority of the load transfer between the engine 10 and the aircraft on which it is in operation mounted (not shown) and are attached at their radially inner ends to the axially downstream end of a generally cylindrical support member 25 which is located coaxially within the power turbine 12. The cylindrical support member 25 carries all of the contra-rotating elements of the power turbine 12 and is attached at its upstream end to the downstream end of the casing 26 of the core engine 11 by means of a load transfer structure generally indicated at 27.

Figure 2:
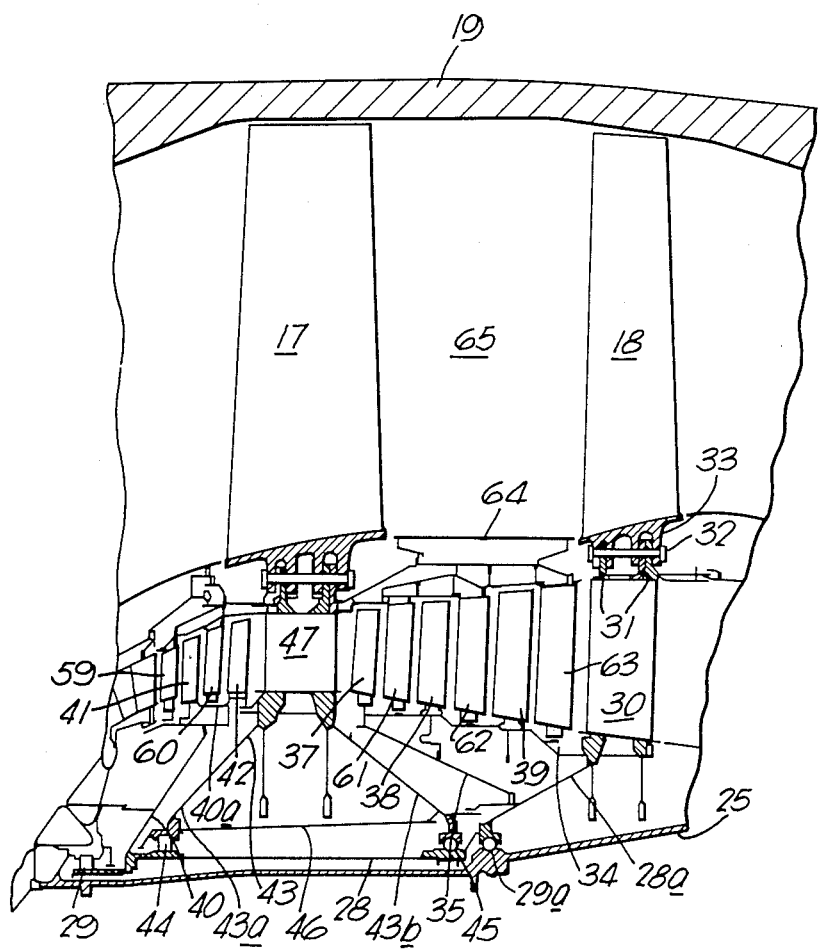
FIG. 2 is a sectioned side view of a portion of the power turbine shown in FIG. 1.

The support member 25 has, as can be seen in FIG. 2, a shaft 28 journalled coaxially thereon by means of two axially spaced apart sets of bearings 29 and 29a. The shaft 28 has a portion 28a of frusto-conical form at its downstream end which carries an annular array of radially extending turbine blades 30. Each turbine blade 30 is provided at its radially outer end with two axially spaced apart radially extending apertured lugs 31. The lugs 31 carry a pin 32 which in turn locates within four axially spaced apart radially extending apertured lugs 33 provided on the radially inner end of a corresponding downstream fan blade 18.

The frusto-conical shaft portion 28 has further generally frusto-conical shaft portions 34 and 35 attached thereto. One of the frusto-conical shaft portion 35 is located radially inwardly of and serves to support the upstream end 36 of the other frusto-conical shaft portion 34. The frusto-conical shaft portion 34 carries the radially inner extents of three annular arrays of turbine blades 37,38 and 39 and additionally serves to define a radially inner portion of the turbine exhaust passage through the power turbine 12.

The upstream end of the shaft 28 is also provided with a frusto-conical portion 40 which serves to carry two annular arrays of radially extending turbine blades 41 and 42 and structure 40a which defines a further radially inner portion of the turbine exhaust passage through the power turbine 12. It will be seen therefore that rotation of the shaft 28 results in the corresponding rotation of the turbine blade arrays 30,37,38,39,41 and 42 as well as the array of downstream fan blades 18.

The shaft 28 has a further shaft 43 journalled coaxially thereon by two axially spaced apart bearings 44 and 45. The shaft 43 consists essentially of two frusto-conical portions 43a and 43b which are linked at their radially inner extents by a cylindrical member 46.

The frusto-conical shaft portions 43a and 43b are attached at their radially outer extents to the radially inner extents of an array of turbine blades 47.

Figure 3:
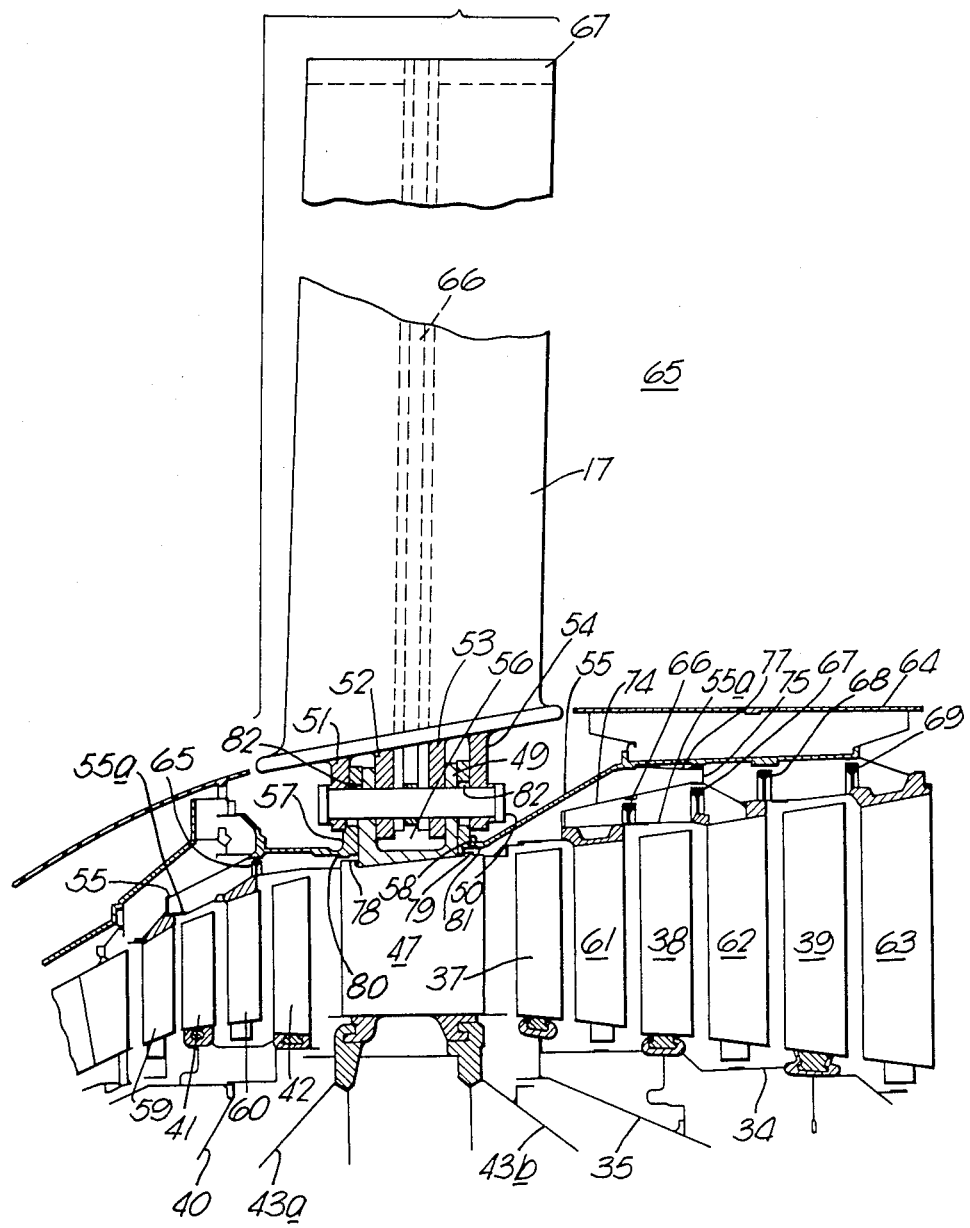
FIG. 3 is a enlarged view of the portion of the power turbine as shown in FIG. 2.

Each of the turbine blades 47, as can be seen more clearly in FIG. 3, is provided at its radially outer extent with two axially spaced apart radially extending apertured lugs 48 and 49. The apertures in the lugs 48 and 49 carry a pin 50 which locates in turn in apertures provided in axially spaced apart radially extending lugs 51,52,53 and 54 provided on the radially inner end of the upstream fan blade 17. A primary drum member 55 which extends both upstream and downstream of the turbine blades 47 is interposed between the turbine blades 47 and fan blades 17 so as to rotate therewith. The drum member 55 is provided with apertures 56 which correspond with the lugs 48 and 49 on the radially outer extents of each of the turbine blades 47 so as to permit direct attachment of each fan blade 17 to its corresponding turbine blade 47. The apertures 56 are provided at their upstream and downstream ends with apertured lugs 57 and 58 respectively through which the pins 50 extend. The apertures in the lugs 57 and 58 are of greater diameter than that of the pin 50 so that limited relative radial movement is permitted between the primary drum member 15 and the turbine blades 47 up to a limit at which the drum member 55 provides at least partial radial support for any of the fan blades 17. It will be seen therefore that the cooperation of the lugs 48 and 49 with the apertures 56 ensures that the drum member 55 is maintained in coaxial relationship with the axis of the power turbine 12 and that the turbine blade arrays 59,60,61,62 and 63 drive the fan blades 17.

The upstream end of the primary drum member 55 serves to support the radially outer extents of two annular arrays of turbine blades 59 and 60 which are interposed between the turbine blades 41 and 42. Likewise the downstream portion of the primary drum member 55 serves to support the radially outer extents of three annular arrays of turbine blades 61,62 and 63 which are interposed between the turbine blades 37,38 and 39 respectively. The primary drum member 55 additionally serves to provide a structure 55a which defines a radially outer portion of the turbine exhaust passage through the power turbine 12.

The radially outer extent of the downstream end of the primary drum member 55 has a boundary defining cylinder 64 attached thereto which serves to define a portion of the radially inner boundary of the gas passage 65 which contains the fan blades 17 and 18 and is enclosed by the cowling 19.

It will be seen therefore that rotation of the shaft 43 results in the rotation of the annular array of turbine blades 47, the drum member 55, the annular arrays of turbine blades 59,60,61,62 and 63, and of the annular array of upstream fan blades 17.

Each fan blade 17 is hollow and contains radially extending fibres 17a of an aramid material which are bonded to the tip region 67 of the fan blade 17 and are anchored at their radially inner extents to the pin 50. Although only two tows of fibres 17a are shown in the drawing it will be appreciated that further tows may be distributed throughout the fan blade 17 and attached at appropriate positions to the pin 15. Similar fibres may be provided within the fan blades 18 and anchored to the pins 32. The fibres 17a are not normally load carrying. However in the event of structural failure of any of the blades 17 and 18, the fibres 17a serve to ensure that no pieces of the fan blades 17 or 18 are lost to cause damage to the engine 10 or the aircraft on which it is mounted.

The turbine blade arrays within the power turbine 12 are so configured that alternate arrays contra-rotate so that the shafts 28 and 43 contra-rotate as do the arrays of fan blades 17 and 18 to provide propulsive thrust.

Figure 4:
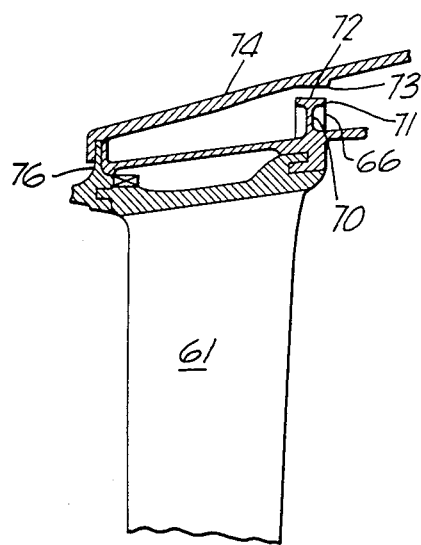
FIG. 4 is a detailed view of a portion of the power turbine shown in FIGS. 2 and 3.

The cylindrical structure 55a which defines a radially outer portion of the turbine exhaust gas passage through the power turbine 12 interconnects the radially outer extents of the turbine blades 59,60,47,61,62 and 63. It additionally supports five ring members 65,66,67,68 and 69 which are respectively positioned adjacent the radially outer extents of the turbine blade arrays 60,61,62 and 63. The ring members 65 to 69 are of generally similar configuration and the ring member 66 which can be seen more clearly in FIG. 4 typifies this configuration. It consists essentially of a radially extending diaphragm 70 located radially outwardly of the downstream region of the turbine blade array 61 having an enlarged rim 71 on its periphery. The rim 71 provides circular stiffness and defines an annular abutment surface 72 which is radially spaced apart from a corresponding abutment surface 73 provided on a frusto-conical portion 74 of a secondary drum member 75. The secondary drum member 75 is interposed between the radially outer extents of the turbine blades 61,62 and 63 and the primary drum 55.

The upstream end of the frusto-conical portion 74 of the secondary drum member 75 is fixedly attached to structure 76 supporting the radially outer portion of the upstream region of the turbine blade array 61.

When the power turbine 12 is below its normal operating temperature, a radial gap is arranged to be present between the abutment surfaces 72 and 73. This permits the turbine blades 61, which are operationally situated in a hot environment, to thermally expand without imposing undesirable radial loadings upon the primary drum member 55. However the radial gap is so dimensioned that when the power turbine 12 reaches its normal operating temperature i.e. the temperature reached under normal cruise conditions, the gap is closed so that any further radial movement is inhibited and the rigidity of the turbine blade 61 and primary drum member 55 assembly is increased.

The ring members 65, 698 and 69 are radially spaced apart from corresponding abutment faces provided on the primary drum member 55 while the remaining ring member 67 is radially spaced apart from a corresponding abutment face on the secondary drum member 75. In all cases, the radial gaps are arranged so that they close due to thermal expansion when normal turbine operating temperatures are reached, thereby providing structural rigidity to the whole assembly.

The secondary drum member 75 is additionally interconnected with the primary drum member 55 via a frusto-conical link member 77 which permits resilient relative radial movement between the primary and secondary drum members 55 and 75. The axially downstream end of the link member 77 is radially spaced apart from the primary drum member by a radial gap which is intended to close by thermal expansion when normal turbine operating temperatures are reached, thereby contributing additional rigidity to the assembly.

Each of the turbine blades 47 is provided at its radially outer extent with axially spaced apart abutment surfaces 78 and 79 which are, when the power turbine 12 is below its normal operating temperature, radially spaced apart from annular abutment surfaces 80 and 81 provided on the primary drum member 55. As the turbine blades 47 increase in temperatures to their normal operating temperature, they thermally expand at a faster rate than the primary drum member 55. The gaps between the abutment surfaces 78 and 79 on the turbine blades 47 and those on the primary drum member are chosen so that when the normal operating temperature is reached, the gaps close so as to give additional rigidity to the turbine blade 47/fan blade 17/primary drum member 55 structure.

In order to permit the turbine blades 47 to thermally expand in a radial direction by a greater degree than the primary drum member 55, the holes 82 in the lugs 57 and 58 of the primary drum member 55 are oversized as can be seen in FIG. 3. This permits a limited degree of relative radial movement between the turbine blade 47/fan blade 17 assembly and the primary drum member 55.

It will be seen therefore that the present invention provides a contra-rotating power turbine which is tolerant of a high level of thermal expansion of its rotary turbine blades and which provides a rigid structure at normal operating temperatures.

Although the present invention has been described with reference to a gas turbine engine provided with a ducted fan, it will be appreciated that it is equally applicable to other forms of gas turbine engine such as, for instance, one provided with aerofoil propulsion blades which are not ducted.

I claim:

1. A turbine comprising at least one annular array of rotary blades, primary drum means surrounding the radially outer extents of said turbine blades and adapted to rotate coaxially therewith, said blades being supported by said primary drum means and independently of any other portion of said turbine whereby said primary drum means defines the sole means of support for said turbine blades, and interconnection means interconnecting said turbine blade radially outer extents and said primary drum means, said interconnection means being adapted to prevent relative axial movement between said turbine blades and said primary drum means, but permit relative radial movement therebetween when said turbine is below its normal operational temperature, said interconnection means including abutment surfaces which are radially spaced apart when said turbine is below its normal operational temperature, and is so arranged that when said turbine reaches its normal operating temperature, thermal expansion of said turbine blades causes said abutment surfaces to engage each other to inhibit relative radial movement between said turbine blades and said primary drum, and thereby increase the rigidity of said turbine.

2. A turbine as claimed in claim 1 wherein said abutment surfaces are annular.

3. A turbine as claimed in claim 1 wherein said interconnection means comprises at least one ring member surrounding and interconnected with the radially outer extents of said turbine blades so as to thermally expand radially therewith, said at least one ring member including at least one of said abutments surfaces, said at least one abutment surface being positioned opposite a corresponding at least one abutment surface located radially outwardly thereof and associated with said primary drum means.

4. A turbine as claimed in claim 1 wherein said interconnection means comprises at least one secondary drum means interconnecting said primary drum means and the radially outer extents of said turbine blades, said secondary drum means having a portion of generally frusto-conical form to provide a resilient radial interconnection between said turbine blades and said primary drum means.

5. A turbine as claimed in claim 4 wherein said secondary drum means has at least one of said abutment surfaces located thereon.

6. A turbine as claimed in claim 1 wherein said turbine comprises a plurality of said annular arrays of turbine blades, each of said turbine blades of one of said annular arrays having a radially extending aerofoil propulsion blade attached to the radially outer extent thereof, each of which aerofoil propulsion blade is located radially outwardly of said primary drum means.

7. A turbine as claimed in claim 6 wherein the region of interconnection between each said turbine blade and its associated aerofoil propulsion blade locates in a corresponding aperture provided in said primary drum member, so that said assembly of turbine blades and corresponding aerofoil propulsion blades provide axial location of said primary drum member and maintain said primary drum member generally coaxial with the axis of said turbine.

8. A turbine as claimed in claim 6 wherein each of said aerofoil propulsion blades includes first and second lugs having an aperture defined therethrough and wherein said turbine blades include first and second lugs having an aperture defined therethrough, and wherein each of said aerofoil propulsion blades is attached to its corresponding turbine blade by a pin fixing which extends through said apertures of said lugs.

9. A turbine as claimed in claim 8 wherein said drum member is provided with apertures which correspond with said lugs of each of said turbine blades and said pin fixing extends therethrough whereby said pin fixing provides additional support for said primary drum member.

10. A turbine as claimed in claim 6 further comprises coaxial annular arrays of further turbine blades mounted to and rotating with a shaft of the turbine and alternately axially interposed between said turbine blades.

11. A turbine as claimed in claim 10 wherein said axially alternate arrays of turbine blades and further turbine blades are respectively mounted for rotation in opposite directions about a longitudinal axis of said shaft.

12. A turbine as claimed in claim 11 wherein each of the turbine blades of one of said annular arrays of further turbine blades has a radially extending aerofoil propulsion blade attached to the radially outer extent thereof, each of which aerofoil propulsion blades is located radially outwardly of said primary drum means.

13. A turbine as claimed in claim 12 wherein both of said annular arrays of aerofoil propulsion blades are enclosed within a cowling.

14. A turbine as claimed in claim 12 wherein said primary drum means additionally carries means defining the radially inner boundary to the gas flow over said aerofoil propulsion blades.

* * * * *